United States Patent
Yamada et al.

(10) Patent No.: US 8,662,884 B2
(45) Date of Patent: Mar. 4, 2014

(54) METHOD AND APPARATUS OF CONTROLLING OXYGEN SUPPLY FOR BOILER

(75) Inventors: Toshihiko Yamada, Tokyo (JP); Terutoshi Uchida, Tokyo (JP); Masami Sato, Tokyo (JP)

(73) Assignees: IHI Corporation, Tokyo (JP); Electric Power Development Co., Ltd., Tokyo (JP)

( * ) Notice: Subject to any disclaimer, the term of this patent is extended or adjusted under 35 U.S.C. 154(b) by 676 days.

(21) Appl. No.: 12/920,686

(22) PCT Filed: Mar. 6, 2008

(86) PCT No.: PCT/JP2008/000470
§ 371 (c)(1),
(2), (4) Date: Nov. 8, 2010

(87) PCT Pub. No.: WO2009/110032
PCT Pub. Date: Sep. 11, 2009

(65) Prior Publication Data
US 2011/0045421 A1   Feb. 24, 2011

(51) Int. Cl.
*F23N 1/02* (2006.01)

(52) U.S. Cl.
USPC ............ 431/12; 431/278; 431/281; 110/185; 110/186; 110/187; 110/188; 110/208

(58) Field of Classification Search
USPC ............... 431/12, 278, 281; 110/185–188, 110/203–208, 233, 234; 73/195–196
See application file for complete search history.

(56) References Cited

U.S. PATENT DOCUMENTS

| | | | | |
|---|---|---|---|---|
| 1,098,247 | A | * | 5/1914 | Gibbs .................... 73/861.62 |
| 3,481,538 | A | * | 12/1969 | Dines ..................... 236/24.5 |
| 3,998,097 | A | * | 12/1976 | Akashi et al. ............. 73/861.61 |
| 4,403,941 | A | * | 9/1983 | Okiura et al. ............... 431/10 |

(Continued)

FOREIGN PATENT DOCUMENTS

| | | | |
|---|---|---|---|
| EP | 0 413 104 A1 | 2/1991 | |
| JP | 61027410 A | * 2/1986 | ............. F23C 11/00 |

(Continued)

OTHER PUBLICATIONS

Extended European Search Report Issued May 9, 2012 in Patent Application No. 08720356.8

*Primary Examiner* — Kenneth Rinehart
*Assistant Examiner* — Jorge Pereiro
(74) *Attorney, Agent, or Firm* — Oblon, Spivak, McClelland, Maier & Neustadt, L.L.P.

(57) ABSTRACT

An apparatus of controlling oxygen supply for a boiler having wind boxes $2a$ and $2b$ arranged on left and right of a boiler body 1 is configured to control supply balance of oxygen by adjusting oxygen supply opening degrees of the left and right oxygen distribution dampers $15a$ and $15b$ in accordance with a oxygen supply flow rate and left and right actually measured oxygen concentrations when controlling the oxygen supply amounts and to control the exhaust gas flow rates by correcting an exhaust gas flow rate set value corresponding to a boiler load demand in accordance with an oxygen concentration set value corresponding to a boiler load demand, left and right actually measured exhaust gas flow rates and left and right actually measured oxygen concentrations and adjusting left and right exhaust gas introduction opening degrees of the left and right exhaust gas introduction dampers $8a$ and $8b$ when controlling the exhaust gas flow rates.

7 Claims, 5 Drawing Sheets

(56) References Cited

U.S. PATENT DOCUMENTS

| | | | |
|---|---|---|---|
| 4,603,063 A * | 7/1986 | Sato et al. | 427/383.7 |
| 4,926,698 A * | 5/1990 | Owen | 73/861.61 |
| 5,044,287 A | 9/1991 | Furukawa et al. | |
| 5,401,162 A * | 3/1995 | Bonne | 431/12 |
| 6,203,187 B1 * | 3/2001 | Abbasi et al. | 366/167.1 |
| 6,279,495 B1 | 8/2001 | Karidio et al. | |
| 6,289,266 B1 * | 9/2001 | Payson et al. | 700/274 |
| 6,490,985 B2 * | 12/2002 | Yamamoto et al. | 110/345 |
| 6,612,186 B1 * | 9/2003 | Patten et al. | 73/861.04 |
| 6,843,185 B1 * | 1/2005 | Taylor | 110/261 |
| 6,935,251 B2 | 8/2005 | Marin et al. | |
| 7,401,577 B2 * | 7/2008 | Saucedo et al. | 122/448.1 |
| 7,922,480 B2 * | 4/2011 | Kiyama et al. | 431/10 |
| 8,015,932 B2 * | 9/2011 | Eiteneer et al. | 110/262 |
| 8,082,737 B2 * | 12/2011 | Patrick et al. | 60/653 |
| 8,246,343 B2 * | 8/2012 | Ghani et al. | 431/9 |
| 2004/0200222 A1 * | 10/2004 | Marin et al. | 60/679 |
| 2006/0115779 A1 * | 6/2006 | Yamamoto et al. | 431/115 |
| 2006/0115780 A1 * | 6/2006 | Kiyama et al. | 431/182 |
| 2008/0156236 A1 * | 7/2008 | Ito et al. | 110/191 |
| 2008/0160464 A1 * | 7/2008 | Ghani et al. | 431/9 |
| 2008/0190092 A1 * | 8/2008 | Osakabe et al. | 60/39.12 |
| 2009/0031933 A1 | 2/2009 | Ookawa et al. | |
| 2009/0078175 A1 * | 3/2009 | Eiteneer et al. | 110/210 |
| 2009/0100822 A1 * | 4/2009 | Osakabe et al. | 60/39.281 |
| 2009/0158976 A1 * | 6/2009 | Patrick et al. | 110/234 |
| 2009/0272300 A1 * | 11/2009 | Yamada et al. | 110/190 |
| 2009/0277363 A1 * | 11/2009 | Shibata et al. | 110/186 |
| 2010/0107940 A1 * | 5/2010 | Shibata et al. | 110/347 |
| 2010/0224108 A1 * | 9/2010 | Kamikawa et al. | 110/188 |
| 2011/0220037 A1 * | 9/2011 | Hu et al. | 122/23 |
| 2012/0312207 A1 * | 12/2012 | Ghani et al. | 110/347 |

FOREIGN PATENT DOCUMENTS

| | | | |
|---|---|---|---|
| JP | 63 306309 | 12/1988 | |
| JP | 4-244504 A | 9/1992 | |
| JP | 5-26409 A | 2/1993 | |
| JP | 5-168853 A | 7/1993 | |
| JP | 5-172305 A | 7/1993 | |
| JP | 7-318016 A | 12/1995 | |
| JP | 9 137915 | 5/1997 | |
| JP | 2001-235103 A | 8/2001 | |
| JP | 2001-336736 | 12/2001 | |
| JP | 2001 336736 | 12/2001 | |
| JP | 2002206736 A * | 7/2002 | F23N 3/06 |

* cited by examiner

METHOD AND APPARATUS OF CONTROLLING OXYGEN SUPPLY FOR BOILER

TECHNICAL FIELD

The present invention relates to a method and an apparatus of controlling oxygen supply for a boiler.

BACKGROUND ART

Recently, in order to prevent global warming, it is desired to reduce emissions of greenhouse gases such as carbon dioxide and technologies are being developed for capturing carbon dioxide from combustion exhaust gas emitted from an oxyfuel combustion boiler for a storage process in ocean or in the underground formation.

Such an oxyfuel combustion boiler includes an oxygen introduction line which introduces oxygen to an atmosphere supply line connected to a wind box on an input side of a boiler body, and a recirculation gas line branched from an exhaust gas line connected to an output side of the boiler body and connected to the atmosphere supply line. At a start-up, the air is introduced from the atmosphere supply line to the boiler body to burn fuel. After the completion of the start-up, dampers or the like arranged in the lines are switched to circulate an exhaust gas emitted from the boiler body through the recirculation gas line or the like to the boiler body; oxygen is introduced from the oxygen introduction line to the boiler body to perform the oxyfuel combustion of the fuel while constraining the lowering of oxygen concentration due to the recirculation gas to increase the carbon dioxide concentration in the exhaust gas and capture carbon dioxide from a portion of the exhaust gas.

Such technique concerning a method and an apparatus of controlling oxygen supply for a boiler is disclosed, for example, in Patent Literature 1.

[Patent Literature 1] JP 2001-336736A

SUMMARY OF INVENTION

Technical Problems

Such boiler facilities have wind boxes on left and right sides of a boiler body, and exhaust gas is circulated in such a manner that the exhaust gas from the recirculation gas line and oxygen from the oxygen introduction line are introduced through the atmosphere supply line to the left and right wind boxes for circulation of the exhaust gas, so that unbalance in oxygen supply amount and exhaust gas flow rate may occur between the left and right wind boxes, disadvantageously resulting in unsteady combustion in the boiler body.

The invention was made in view of the above and has its object to provide a method and an apparatus of controlling oxygen supply for a boiler capable of constraining unbalance in oxygen supply amount and exhaust gas flow rate into wind boxes to achieve steady combustion in a boiler body.

Solution to Problems

The invention provides a method of controlling oxygen supply for a boiler wherein, for wind boxes arranged on left and right of a boiler body, oxygen is supplied to the left and right sides with oxygen supply amounts being controlled respectively and exhaust gas is introduced to the left and right sides with exhaust gas flow rates being controlled respectively, comprising controlling supply balance of oxygen by adjusting left and right oxygen supply amounts in accordance with an oxygen supply flow rate and left and right actually measured oxygen concentrations when controlling the oxygen supply amounts; and controlling the exhaust gas flow rates by correcting an exhaust gas flow rate set value corresponding to a boiler load demand in accordance with an oxygen concentration set value corresponding to a boiler load demand, left and right actually measured exhaust gas flow rates and left and right actually measured oxygen concentrations and adjusting left and right exhaust gas introductions when controlling the exhaust gas flow rates.

In the method of controlling oxygen supply for the boiler and when controlling the oxygen supply amounts, preferably, the oxygen supply flow rate is measured; the left and right oxygen supply amounts are set in accordance with the oxygen supply flow rate; the left and right actual oxygen concentrations are measured; and the left and right oxygen supply amounts are corrected with the left and right actually measured oxygen concentrations.

In the method of controlling oxygen supply for the boiler and when controlling the exhaust gas flow rates, preferably, an exhaust gas flow rate set value corresponding to a boiler load demand is set; an exhaust gas flow rate set amount is multiplied by an oxygen concentration set value corresponding to a boiler load demand; the left and right actually measured exhaust gas flow rates are subtracted; and the left and right actually measured oxygen concentrations are added to adjust the left and right exhaust gas introductions.

On the other hand, the invention provides an apparatus of controlling oxygen supply for a boiler comprising wind boxes arranged on left and right of a boiler body, left and right recirculation gas lines for introduction of an exhaust gas to the left and right wind boxes, exhaust gas introduction dampers for adjustment of exhaust gas flow rates of the left and right recirculation gas lines, left and right exhaust gas flowmeters for detection of the exhaust gas flow rates of the left and right recirculation gas lines, left and right oxygen concentration monitors for detection of oxygen concentrations of the left and right recirculation gas lines, an oxygen supply line for supply of oxygen to the left and right recirculation gas lines, an oxygen flowmeter for detection of a supply flow rate of oxygen supplied to the left and right recirculation gas lines, left and right oxygen distribution dampers for adjustment of oxygen supply amounts such that the left and right recirculation gas lines receive supply from the oxygen supply line, and a control unit for control of the exhaust gas introduction and oxygen distribution dampers, wherein the control unit is configured to control supply balance of oxygen by adjusting oxygen supply opening degrees of the left and right oxygen distribution dampers in accordance with a oxygen supply flow rate and left and right actually measured oxygen concentrations when controlling the oxygen supply amounts and to control the exhaust gas flow rates by correcting an exhaust gas flow rate set value corresponding to a boiler load demand in accordance with an oxygen concentration set value corresponding to a boiler load demand, left and right actually measured exhaust gas flow rates and left and right actually measured oxygen concentrations and adjusting left and right exhaust gas introduction opening degrees of the left and right exhaust gas introduction dampers when controlling the exhaust gas flow rates.

In the apparatus of controlling oxygen supply for the boiler, preferably, the control units is configured to adjust the oxygen supply opening degrees by measuring the oxygen supply flow rate with the oxygen flow meter, setting reference opening degrees of the left and right oxygen distribution dampers in accordance with the oxygen supply flow, measuring the left and right actual oxygen concentrations with the oxygen concentration monitors and correcting the reference opening degrees of the left and right oxygen distribution dampers with the left and right actually measured oxygen concentrations when controlling the oxygen supply amounts.

In apparatus of controlling the oxygen supply for the boiler, preferably, the control units sets an exhaust gas flow rate set amount corresponding to a boiler load demand, multiplies the exhaust gas flow rate set amount by an oxygen concentration set value corresponding to a boiler load demand, subtracts the left and right actual exhaust gas flow rates measured by the exhaust gas flowmeters and adds the left and right actual oxygen concentrations measured by the left and right oxygen concentration monitors to adjust the exhaust gas introduction opening degrees of the left and right exhaust gas introduction dampers when controlling the exhaust gas flow rates.

Preferably, the apparatus of controlling oxygen supply for the boiler further comprises oxygen adjustment lines branched from the oxygen supply line and connected to the left and right recirculation gas lines and adjusting means disposed in the oxygen adjustment lines, wherein the adjusting means are configured to be capable of finely adjusting the oxygen supply amounts of the recirculation gas lines by controlling oxygen from the oxygen adjustment lines.

In the method and the apparatus of controlling oxygen supply for the boiler, when the oxygen supply amounts are controlled for the left and right wind boxes, the left and right oxygen supply amounts are adjusted in accordance with the oxygen supply flow rate and the left and right actually measured oxygen concentrations to control the supply balance of oxygen and, when the exhaust gas flow rates are controlled, the left and right exhaust gas introductions are adjusted in accordance with the oxygen concentration set values corresponding to the boiler load demands, the left and right actually measured exhaust gas flow rates and the left and right actually measured oxygen concentrations to control the exhaust gas flow rates and, therefore, unbalance may be constrained in the oxygen supply amounts and the exhaust gas flow rates introduced into the left and right wind boxes to achieve steady combustion in the boiler body.

ADVANTAGEOUS EFFECTS OF INVENTION

According to a method and an apparatus of controlling oxygen supply for a boiler, an excellent effect may be achieved which may constrain unbalance in an oxygen supply amount and a exhaust gas flow rate introduced into left and right wind boxes to achieve steady combustion in a boiler body.

REFERENCE SIGNS LIST 1 boiler body
2a wind box
5a recirculation gas line
5b recirculation gas line
6 oxygen concentration monitor
8a exhaust gas introduction damper
8b exhaust gas introduction damper
9a exhaust gas flowmeter
9b exhaust gas flowmeter
10a oxygen concentration monitor
10b oxygen concentration monitor
11 oxygen supply line
15a oxygen distribution damper
15b oxygen distribution damper
16 oxygen flowmeter
29a boiler load demand
29b boiler load demand
30 exhaust gas flow rate set value
32 oxygen concentration set value
71 oxygen supply line
72a oxygen adjustment line
72b oxygen adjustment line
73a hand valve (adjusting means)
73b hand valve (adjusting means)

DESCRIPTION OF EMBODIMENTS

A first embodiment of the invention will be described with reference to the accompanying drawings.

FIGS. 1 to 4 show the first embodiment of a method and an apparatus of controlling oxygen supply for a boiler of the invention.

In the apparatus of controlling oxygen supply for the boiler of the first embodiment, wind boxes 2a and 2b are disposed on left and right sides of a boiler body 1 and a burner 3 supplied with fuel in the boiler body 1 is arranged in the wind boxes 2a and 2b. An exhaust gas line 4 is connected to an output side of the boiler body 1 such that the exhaust gas may be emitted, and the wind boxes 2a and 2b on an input side of the boiler body 1 are connected to two recirculation gas lines 5a and 5b as separate systems corresponding to lateral sides (shown as sides A and B in FIG. 1), respectively. An oxygen concentration monitor 6 for detection of an oxygen concentration is incorporated in the exhaust gas line 4. The recirculation gas lines 5a and 5b may be connected to an atmosphere supply line (not shown) capable of introducing the atmosphere to the wind boxes 2a and 2b.

Figure 1:
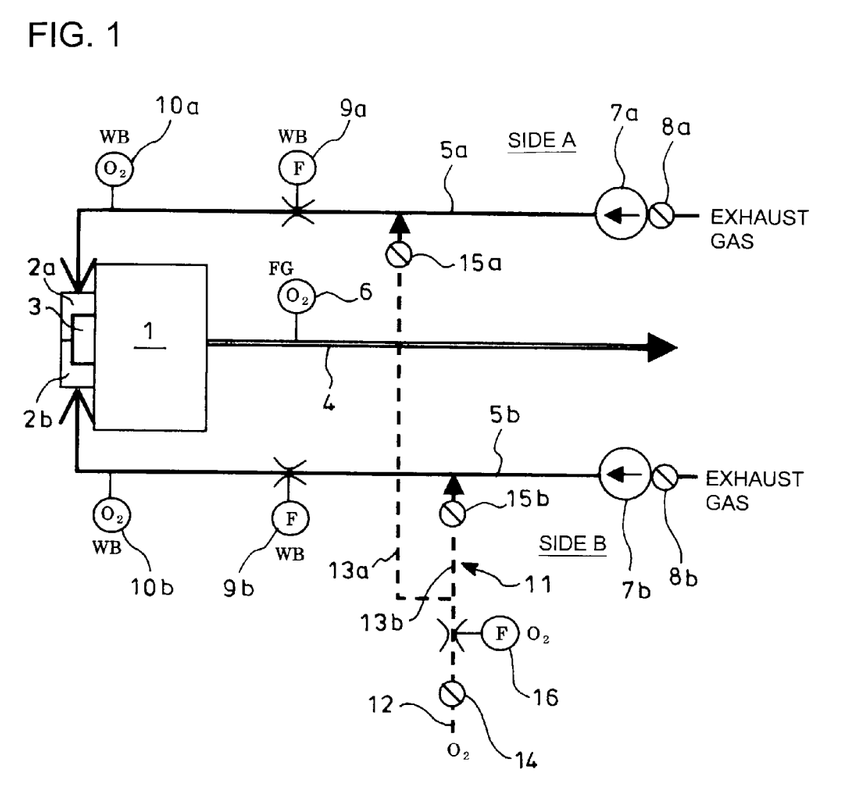
FIG. 1 is a conceptual diagram of a first embodiment of the invention.

The recirculation gas lines 5a and 5b have exhaust gas introduction dampers 8a and 8b such as adjustment dampers arranged adjacent to fans 7a and 7b so as to separately adjust the circulating exhaust gas flow rates into the wind boxes 2a and 2b, respectively. Incorporated in the recirculation gas lines 5a and 5b are left and right exhaust gas flowmeters 9a and 9b for detection of the left and right exhaust gas flow rates and left and right oxygen concentration monitors 10a and 10b for detection of the oxygen concentrations in the exhaust gas, respectively.

The recirculation gas lines 5a and 5b are connected to an oxygen supply line 11 comprising a main supply line 12 on an oxygen supply source side and two connection supply lines 13a and 13b branched therefrom. The main supply line 12 of the oxygen supply line 11 has oxygen supplying means 14 such as a damper for adjustment of a total oxygen flow rate and an oxygen flowmeter 16 for detection of an oxygen supply flow rate. The connection supply lines 13a and 13b have oxygen distribution dampers 15a and 15b such as adjustment dampers for adjustment of the oxygen supply amounts to the recirculation gas lines 5a and 5b, respectively.

On the other hand, all of the oxygen concentration monitor 6, the exhaust gas flowmeters 9a and 9b, the oxygen concentration monitors 10a and 10b and the oxygen flowmeter 16 are connected to a control unit (not shown) comprising processing means S1 for control of the oxygen supply amounts to the wind boxes 2a and 2b and processing means S2 for control of the exhaust gas flow rates to the wind boxes 2a and 2b so as to control the exhaust gas introduction and oxygen distribution dampers 8a, 8b, 15a and 15b based on signals of the exhaust gas flowmeters 9a and 9b, etc.

Figure 2:
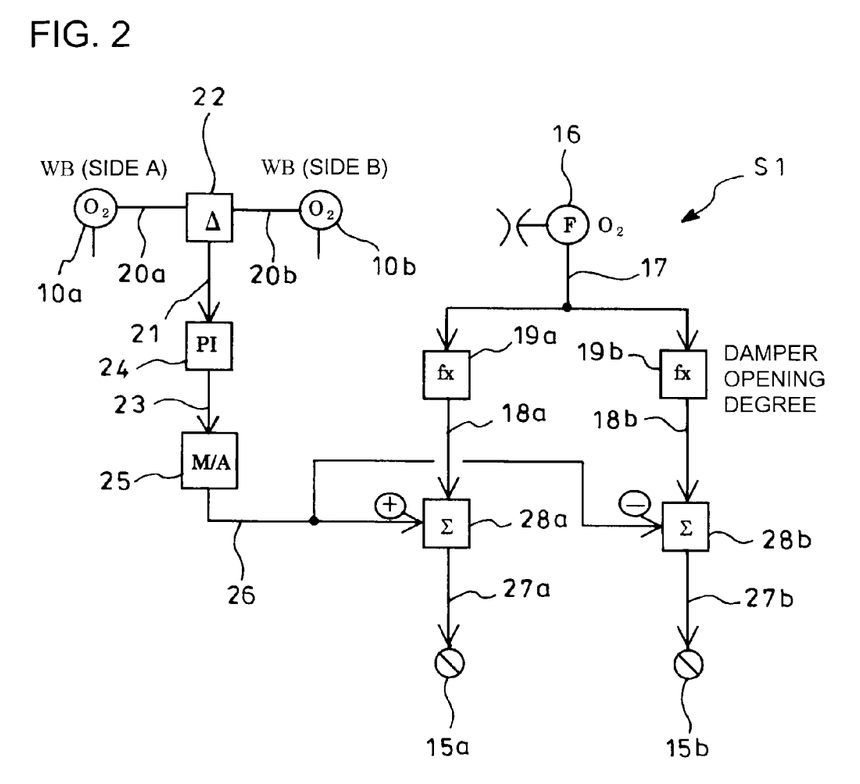
FIG. 2 is a control block diagram for control of an oxygen supply flow rate in the first embodiment of the invention.

As shown in FIG. 2, the processing means S1 for control of the oxygen supply amount in the control unit comprises function generators 19a and 19b which output reference opening demands (reference opening degrees) 18a and 18b of the left and right oxygen distribution dampers 15a and 15b in accordance with a flow rate measurement signal (oxygen supply flow rate) 17 of the oxygen flowmeter 16; a subtractor 22 which obtains and outputs an oxygen concentration deviation 21 from concentration measurement signals (actually measured oxygen concentrations) 20a and 20b of the left and right oxygen concentration monitors 10a and 10b; a proportional integral adjuster 24 which executes a proportional integral process of the oxygen concentration deviation 21 from the subtractor 22 to output a control demand 23 for eliminating the oxygen concentration deviation; a manual/automatic operation device 25 switchable to output the control demand 23 from the proportional integral adjuster 24 through manual or automatic operation; and adders 28a and 28b which add a control demand 26 from the manual/automatic operation device 25 to the reference opening demands 18a and 18b from the function generators 19a and 19b to output corrective opening demands 27a and 27b, respectively. Oxygen supply opening degrees of the left and right oxygen distribution dampers 15a and 15b are adjusted by the corrective opening demands 27a and 27b from the adder 28a and 28b, respectively.

Figure 3:
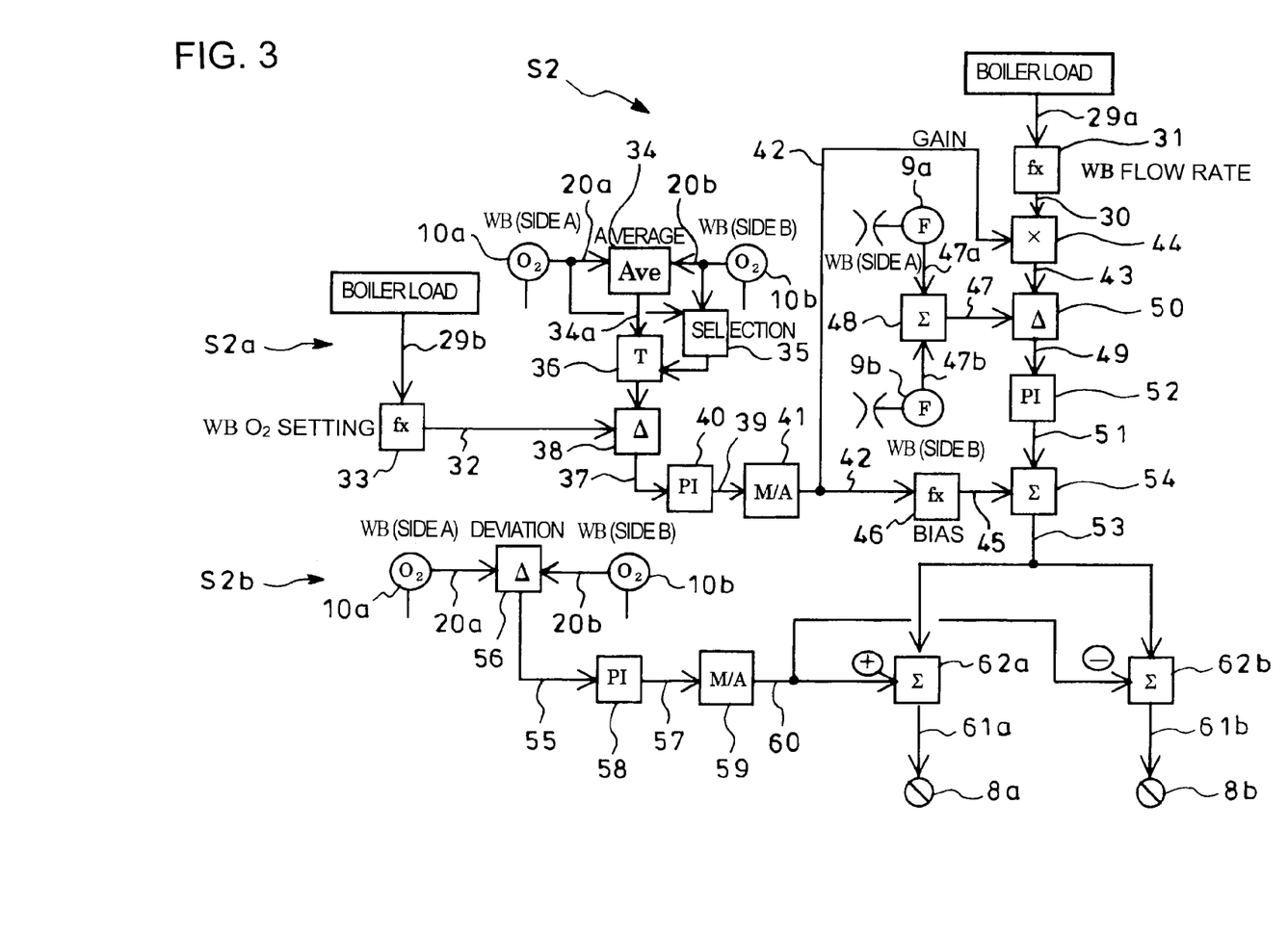
FIG. 3 is a control block diagram for control of an exhaust gas flow rate in the first embodiment of the invention.
Figure 4:
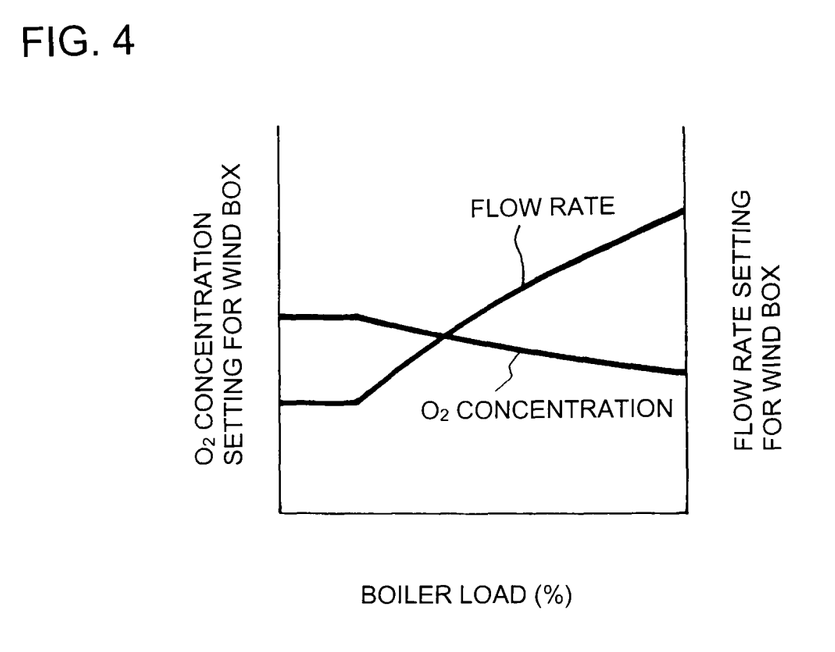
FIG. 4 is a line diagram of functions input to a function generator shown in FIG. 3.

On the other hand, as shown in FIG. 3, the processing means S2 for control of the exhaust gas flow rate in the control unit comprises a first processing unit S2a which calculates an exhaust gas flow rate set value from a boiler load demand and an actually measured exhaust gas flow rate and a second processing unit S2b which adds an actually measured oxygen concentration to the exhaust gas flow rate set value calculated by the first process.

The first processing unit S2a comprises a flow rate function generator 31 which sets and outputs an exhaust gas flow rate set value 30 for the wind boxes 2a and 2b in accordance with a boiler load demand 29a; a concentration function generator 33 which sets and outputs an oxygen concentration set value 32 for the wind boxes 2a and 2b in accordance with a boiler load demand 29b; an average calculator 34 which obtains an average value to output a correction value 34a in accordance with the concentration measurement signals (actually measured oxygen concentrations) 20a and 20b of the left and right oxygen concentration monitors 10a and 10b; a switch 36 which terminates the usage of the average value for switching to output another correction value in accordance with a selection condition 35 in such a case that a difference is too large between left and right oxygen concentrations; a subtractor 38 which obtains and outputs an oxygen concentration set deviation 37 in accordance with the oxygen concentration set value 32 from the concentration function generator 33 and the correction value 34a from the switch 36; a proportional integral adjuster 40 which executes a proportional integral process of the oxygen concentration set deviation 37 from the subtractor 38 to output a control demand 39 for eliminating the deviation; a manual/automatic operation device 41 switchable to output the control demand 39 from the proportional integral adjuster 40 through manual or automatic operation; a multiplier 44 which multiplies the left and right exhaust gas flow rate set value 30 from the flow rate function generator 31 by a control demand 42 from the manual/automatic operation device 41 as a gain demand to output an exhaust gas flow rate correction set value 43; a bias function generator 46 which outputs the control demand 42 from the manual/automatic operation device 41 as a bias demand 45; an adder 48 which adds exhaust gas measurement signals (actually measured exhaust gas flow rates) 47a and 47b of the left and right exhaust gas flowmeters 9a and 9b to output a current data value 47 of the exhaust gas flow rate; an subtractor 50 which obtains and outputs an exhaust gas flow rate set deviation 49 from the exhaust gas flow rate correction set value 43 from the multiplier 44 and the current data value 47 from the adder 48; a proportional integral adjuster 52 which executes a proportional integral process of the exhaust gas flow rate set deviation 49 from the subtractor 50 to output an exhaust gas flow rate control demand 51 for eliminating the exhaust gas flow rate set deviation; and an adder 54 which adds the exhaust gas flow rate control demand 51 from the proportional integral adjuster 52 and the bias demand 45 from the bias function generator 46 to output an exhaust gas flow rate set value 53.

The second processing unit S2b comprises a subtractor 56 which obtains and outputs an oxygen concentration deviation 55 from the concentration measurement signals (actually measured oxygen concentrations) 20a and 20b of the left and right oxygen concentration monitors 10a and 10b; a proportional integral adjuster 58 which executes a proportional integral process of the oxygen concentration deviation 55 from the subtractor 56 to output a control demand 57 for eliminating the oxygen concentration deviation; a manual/automatic operation device 59 switchable to output the control demand 57 from the proportional integral adjuster 58 through manual or automatic operation; and adders 62a and 62b which add a control demand 60 from the manual/automatic operation device 59 to the exhaust gas flow rate set value 53 from the first processing unit S2a to output corrective opening demands 61a and 61b. Exhaust gas introduction opening degrees of the left and right exhaust gas introduction dampers 8a and 8b are adjusted by the corrective opening demands 61a and 61b from the adders 62a and 62b, respectively.

The operation of the first embodiment of the invention will be described.

When the exhaust gas is circulated in the boiler, the control unit, etc., control the oxygen supply amounts to the left and right wind boxes 2a and 2b and control the exhaust gas flow rates to the left and right wind boxes 2a and 2b.

Specifically, when the oxygen supply amounts to the left and right wind boxes 2a and 2b are controlled, the oxygen flowmeter 16 of the oxygen supply line 11 measures the oxygen supply flow rate and sends the flow rate measurement signal 17 to the control unit (not shown) and the left and right oxygen concentration monitors 10a and 10b of the recirculation gas lines 5a and 5b respectively measure the oxygen concentrations and send the concentration measurement signals 20a and 20b to the control unit. As shown in the flow of FIG. 2, the control unit obtains the reference opening demands (reference opening degrees) 18a and 18b of the left and right oxygen distribution dampers 15a and 15b via the function generators 19a and 19b through the flow rate measurement signal 17 to output the demands to the adders 28a and 28b. Concurrently, the oxygen concentration deviation 21 is obtained via subtractor 22 through the left and right concentration measurement signals 20a and 20b; the proportional integral adjuster 24 executes the process for eliminating the oxygen concentration deviation 21; and the control demand 26 for correction is output via the manual/automatic operation device 25 to the adders 28a and 28b. The left and right adders 28a and 28b add the control demand 26 for correction to the reference opening demands 18a and 18b to output the corrective opening demands 27a and 27b to control the oxygen supply opening degrees of the left and right oxygen distribution dampers 15a and 15b.

As a result, the balance of the oxygen supply to the left and right wind boxes 2a and 2b is controlled based on the oxygen supply flow rate of the oxygen supply line 11 and the oxygen concentrations of the left and right recirculation gas lines 5a and 5b.

On the other hand, as shown in FIG. 3, when the exhaust gas flow rates to the left and right wind boxes 2a and 2b are controlled, a boiler load for setting a fuel supply amount, etc., is input; the left and right exhaust gas flowmeters 9a and 9b of the recirculation gas lines 5a and 5b respectively measure the exhaust gas flow rates to send the exhaust gas measurement signals 47a and 47b to the control unit (not shown); and the left and right oxygen concentration monitors 10a and 10b of the recirculation gas lines 5a and 5b respectively measure the oxygen concentrations to send the concentration measurement signals 20a and 20b to the control unit.

The first processing unit S2a of the control unit sets the exhaust gas flow rate set value 30 for the wind boxes 2a and 2b via the flow rate function generator 31 in accordance with the boiler load demand 29a to output the set value to the multiplier 44. Concurrently, the oxygen concentration set value 32 for the wind boxes 2a and 2b is set via the concentration function generator 33 in accordance with the boiler load demand 29b; an average value is obtained by the average calculator 34, etc., in accordance with the concentration measurement signals 20a and 20b of the left and right oxygen concentration monitors 10a and 10b and is output as the correction value 34a; the subtractor 38 obtains the oxygen concentration set deviation 37 in accordance with the oxygen concentration set value 32 and the correction value 34a; the proportional integral adjuster 40 executes the process for eliminating the oxygen concentration set deviation 37; and the control demand 42 is output via the manual/automatic operation device 41 as a gain demand to the multiplier 44 and is output to the bias function generator 46. In a usual case, the average value obtained from the concentration measurement signals 20a and 20b of the left and right oxygen concentration monitors 10a and 10b is applied as the correction value 34a from the average calculator 34 to the subtractor 38 and, if a difference is too large between left and right oxygen concentrations or if a combustion state is not appropriate, it is considered that the selection condition 35 is satisfied and the usage of the average value is terminated and switched to another predetermined value. If the boiler load demands 29a and 29b are given, a control program shown in FIG. 4 sets the oxygen concentrations for the wind boxes 2a and 2b and sets the flow rates of exhaust gas, etc., for the wind boxes 2a and 2b.

The first processing unit S2a outputs the control demand from the bias function generator 46 as the bias demand 45 to the adder 48 and calculates the current data value 47 of the exhaust gas flow rate via the adder 48 in accordance with the exhaust gas measurement signals 47a and 47b of the left and right exhaust gas flowmeters 9a and 9b and output the current data value to the subtractor 50. The multiplier 44 multiplies the exhaust gas flow rate set value 30 from the flow rate function generator 31 by the control demand 42 as a gain demand to output the exhaust gas flow rate correction set value 43; the subtractor 50 obtains the exhaust gas flow rate set deviation 49 from the subtraction between the exhaust gas flow rate correction set value 43 and the exhaust gas flow rate current data value 47; the proportional integral adjuster 52 eliminates the exhaust gas flow rate set deviation 49 and outputs the exhaust gas flow rate control demand 51; and the adder 54 subsequently adds the exhaust gas flow rate control demand 51 and the bias demand 45 from the bias function generator 46 to output the exhaust gas flow rate set value 53.

The second processing unit S2b obtains the oxygen concentration deviation 55 via the subtractor 56 from the left and right concentration measurement signals 20a and 20b, executes the process for eliminating the oxygen concentration deviation 55 with the proportional integral adjuster 58, and outputs the control demand 60 via the manual/automatic operation device 59 to the adders 62a and 62b. The adders 62a and 62b add the control demand 60 to the exhaust gas flow rate set value 53 from the first processing unit S2a to output the corrective opening demands 61a and 61b to control the exhaust gas introduction opening degrees of the left and right exhaust gas introduction dampers 8a and 8b.

As a result, the left and right exhaust gases to the left and right wind boxes 2a and 2b are controlled based on the oxygen concentration set values corresponding to the boiler load demands 29a and 29b, the oxygen concentrations of the left and right recirculation gas lines 5a and 5b and the exhaust gas supply flow rates of the recirculation gas lines 5a and 5b.

As above, according to the first embodiment, when the oxygen supply amounts are controlled for the left and right wind boxes 2a and 2b, the left and right oxygen supply amounts are adjusted in accordance with the oxygen supply flow rate and the left and right actually measured oxygen concentrations to control the supply balance of oxygen and, when the exhaust gas flow rates are controlled, the left and right exhaust gas introductions are adjusted in accordance with the oxygen concentration set values corresponding to the boiler load demands 29a and 29b, the left and right actually measured exhaust gas flow rates and the left and right actually measured oxygen concentrations to control the exhaust gas flow rates and, therefore, unbalance may be constrained in the oxygen supply amounts and the exhaust gas flow rates introduced into the left and right wind boxes 2a and 2b to achieve steady combustion in the boiler body 1.

In the first embodiment, when controlling the oxygen supply amounts, if the control unit is configured to measure the oxygen supply flow rate (flow rate measurement signal 17) with the oxygen flowmeter 16 to set the reference opening degrees (the reference opening demands 18a and 18b) with the left and right oxygen distribution dampers 15a and 15b depending on the oxygen supply flow rate, to measure the left and right actual oxygen concentrations (the concentration measurement signals 20a and 20b, the control demand 26) with the oxygen concentration monitors 10a and 10b, and to correct the reference opening degrees (the reference opening demands 18a and 18b) with the left and right oxygen distribution dampers 15a and 15b in accordance with the left and right actually measured oxygen concentrations to adjust the oxygen supply opening degrees, then the left and right oxygen supply amounts are properly adjusted to control the supply balance of oxygen when controlling the oxygen supply amounts, so that unbalance are further constrained in the oxygen supply amounts introduced into the left and right wind boxes 2a and 2b to achieve more steady combustion in the boiler body 1.

In the first embodiment, when controlling the exhaust gas flow rates, if the control unit sets the exhaust gas flow rate set value 30 corresponding to the boiler load demand 29a, multiplies the exhaust gas flow rate set value 30 by the oxygen concentration set value 32 (the control demand 42) corresponding to the boiler load demand 29a, subtracts the left and right actually measured exhaust gas flow rates (the exhaust gas measurement signals 47a and 47b, the current data value 47) measured by the exhaust gas flowmeters 9a and 9b, adds the left and right actually measured oxygen concentrations (the concentration measurement signals 20a and 20b, the control demand 60) measured by the left and right oxygen concentration monitors 10a and 10b and adjusts the exhaust gas introduction opening degrees with the left and right exhaust gas introduction dampers 8a and 8b, then the left and right exhaust gas introductions are properly adjusted to control the exhaust gas flow rates when controlling the exhaust gas flow rates, so that the unbalance may be further constrained in the oxygen supply amounts and the exhaust gas flow rates into the left and right wind boxes 2a and 2b to achieve more steady combustion in the boiler body 1.

Hereinafter, a second embodiment of the present invention will be described with reference to the accompanying drawings.

Figure 5:
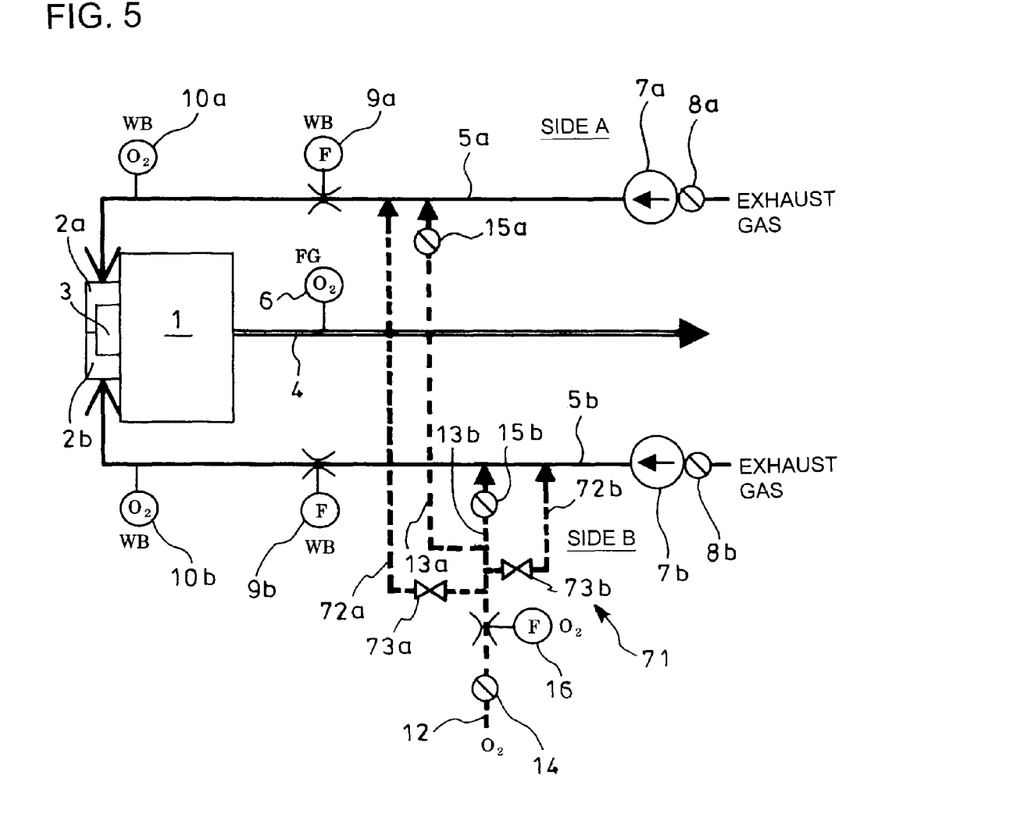
FIG. 5 is a conceptual diagram of a second embodiment of the invention.

FIG. 5 shows the second embodiment of a method and an apparatus of controlling oxygen supply for a boiler of the invention in which parts similar to those shown in FIGS. 1 to 4 are represented by the same reference numerals.

The apparatus of controlling oxygen supply for the boiler according to the second embodiment has a variation from the oxygen supply line 11 of the first embodiment. An oxygen supply line 71 of the second embodiment comprises a main supply line 12 and two connection supply lines 13a and 13b just like the first embodiment, and further comprises oxygen adjustment lines 72a and 72b branched from the main supply line 12 and connected to the left and right recirculation gas lines 5a and 5b.

As in the first embodiment, the main supply line 12 of the oxygen supply line 71 has oxygen supplying means 14 such as a damper for adjustment of a total oxygen flow rate and an oxygen flowmeter 16 for detection of an oxygen supply flow rate, and the two connection supply lines 13a and 13b respectively have oxygen distribution dampers 15a and 15b such as adjustment dampers to adjust the oxygen supply amounts to the recirculation gas lines 5a and 5b.

The oxygen adjustment lines 72a and 72b of the oxygen supply line 71 have hand valves 73a and 73b as adjusting means, respectively.

As in the first embodiment, in the configuration of the second embodiment, all of the oxygen concentration monitor 6, the exhaust gas flowmeters 9a and 9b, the oxygen concentration monitors 10a and 10b and the oxygen flowmeter 16 are connected to a control unit (not shown), and the control unit comprises processing means S1 (see FIG. 2) just like that of the first embodiment to control the oxygen supply amounts to the left and right wind boxes 2a and 2b and processing means S2 (see FIG. 3) just like that of the first embodiment to control the exhaust gas flow rates to the left and right wind boxes 2a and 2b so as to control the exhaust gas introduction and oxygen distribution dampers 8a, 8b, 15a and 15b based on signals of the exhaust gas flowmeters 9a and 9b, etc. The adjusting means may include other valves instead of the hand valves 73a and 73b so as to operate in association with the control unit.

The operation of the second embodiment of the invention will be described.

When the exhaust gas is circulated in the boiler, the control unit, etc., control the oxygen supply amounts and the exhaust gas flow rates to the left and right wind boxes 2a and 2b as in the first embodiment to maintain the supply balance of oxygen to the left and right wind boxes 2a and 2b.

The supply balance of oxygen may not be complete and may have slight shift for various reasons. In this case, a monitor or the like operates the hand valves 73a, 73b as adjusting means to control the oxygen from the oxygen adjustment lines 72a and 72b to finely tune the oxygen supply amounts of the recirculation gas lines 5a and 5b.

As a result, the left and right exhaust gases to the left and right wind boxes 2a and 2b are properly controlled based on the oxygen concentration set values corresponding to the boiler load demands 29a and 29b, the oxygen concentrations of the left and right recirculation gas lines 5a and 5b and the exhaust gas supply flow rates of the recirculation gas lines 5a and 5b.

As above, according to the second embodiment, the same operational effect as the first embodiment can be acquired.

When the second embodiment includes the oxygen adjustment lines 72a, 72b branched from the oxygen supply line 71 and connected to the left and right recirculation gas lines 5a and 5b and the adjusting means such as hand valves 73a, 73b disposed in the oxygen adjustment lines 72a and 72b and the adjusting means are configured to control oxygen from the oxygen adjustment lines 72a, 72b to finely tune the oxygen supply amounts of the recirculation gas lines 5a and 5b, the oxygen supply amounts may easily be finely tuned even when the supply balance of the oxygen is slightly shifted. A monitor or the like may easily finely tune the oxygen supply amounts with the hand valves 73a and 73b as the adjusting means. Since the supply balance of oxygen may be completely achieved, the overall control is facilitated and the appearance may be improved.

It is to be understood that a method and an apparatus of controlling oxygen supply for a boiler according to the invention is not limited to the above embodiments and that various changes and modifications may be made without departing from the scope of the invention.

The invention claimed is:

1. A method of controlling oxygen supply for a boiler wherein, for wind boxes arranged on left and right of a boiler body, oxygen is supplied to the left and right sides with oxygen supply amounts being controlled respectively and exhaust gas is introduced to the left and right sides with exhaust gas flow rates being controlled respectively, comprising controlling supply balance of oxygen by adjusting left and right oxygen supply amounts in accordance with an oxygen supply flow rate and left and right actually measured oxygen concentrations when controlling the oxygen supply amounts; and controlling the exhaust gas flow rates by correcting an exhaust gas flow rate set value corresponding to a boiler load demand in accordance with an oxygen concentration set value corresponding to the boiler load demand, left and right actually measured exhaust gas flow rates and left and right actually measured oxygen concentrations and adjusting left and right exhaust gas introductions when controlling the exhaust gas flow rates.

2. A method of controlling oxygen supply for a boiler as claimed in claim 1, wherein when controlling the oxygen supply amounts, the oxygen supply flow rate is measured; the left and right oxygen supply amounts are set in accordance with the oxygen supply flow rate; the left and right actual oxygen concentrations are measured; and the left and right oxygen supply amounts are corrected with the left and right actually measured oxygen concentrations.

3. A method of controlling oxygen supply for a boiler as claimed in claim 1, wherein when controlling the exhaust gas flow rates, an exhaust gas flow rate set value corresponding to a boiler load demand is set; an exhaust gas flow rate set amount is multiplied by an oxygen concentration set value corresponding to a boiler load demand; the left and right actually measured exhaust gas flow rates are subtracted; and the left and right actually measured oxygen concentrations are added to adjust the left and right exhaust gas introductions.

4. An apparatus of controlling oxygen supply for a boiler comprising wind boxes arranged on left and right of a boiler body, left and right recirculation gas lines for introduction of an exhaust gas to the left and right wind boxes, exhaust gas introduction dampers for adjustment of exhaust gas flow rates of the left and right recirculation gas lines, left and right exhaust gas flowmeters for detection of the exhaust gas flow rates of the left and right recirculation gas lines, left and right oxygen concentration monitors for detection of oxygen concentrations of the left and right recirculation gas lines, an oxygen supply line for supply of oxygen to the left and right recirculation gas lines, an oxygen flowmeter for detection of a supply flow rate of oxygen supplied to the left and right recirculation gas lines, left and right oxygen distribution dampers for adjustment of oxygen supply amounts such that the left and right recirculation gas lines receive supply from the oxygen supply line, and a control unit for control of the exhaust gas introduction and oxygen distribution dampers,
wherein the control unit is configured to control supply balance of oxygen by adjusting oxygen supply opening degrees of the left and right oxygen distribution dampers in accordance with a oxygen supply flow rate and left and right actually measured oxygen concentrations when controlling the oxygen supply amounts and to control the exhaust gas flow rates by correcting an exhaust gas flow rate set value corresponding to a boiler load demand in accordance with an oxygen concentration set value corresponding to a boiler load demand, left and right actually measured exhaust gas flow rates and left and right actually measured oxygen concentrations and adjusting left and right exhaust gas introduction opening degrees of the left and right exhaust gas introduction dampers when controlling the exhaust gas flow rates.

5. An apparatus of controlling oxygen supply for a boiler as claimed in claim 4, wherein the control unit is configured to adjust the oxygen supply opening degrees by measuring the oxygen supply flow rate with the oxygen flow meter, setting reference opening degrees of the left and right oxygen distribution dampers in accordance with the oxygen supply flow rate, measuring the left and right actual oxygen concentrations with the oxygen concentration monitors and correcting the reference opening degrees of the left and right oxygen distribution dampers with the left and right actually measured oxygen concentrations when controlling the oxygen supply amounts.

6. An apparatus of controlling oxygen supply for a boiler as claimed in claim 4, wherein the control unit sets an exhaust gas flow rate set amount corresponding to a boiler load demand, multiplies the exhaust gas flow rate set amount by an oxygen concentration set value corresponding to a boiler load demand, subtracts the left and right actual exhaust gas flow rates measured by the exhaust gas flowmeters and adds the left and right actual oxygen concentrations measured by the left and right oxygen concentration monitors to adjust the exhaust gas introduction opening degrees of the left and right exhaust gas introduction dampers when controlling the exhaust gas flow rates.

7. An apparatus of controlling oxygen supply for a boiler as claimed in claim 4, further comprises oxygen adjustment lines branched from the oxygen supply line and connected to the left and right recirculation gas lines and adjusting means disposed in the oxygen adjustment lines, wherein the adjusting means are configured to be capable of finely adjusting the oxygen supply amounts of the recirculation gas lines by controlling oxygen from the oxygen adjustment lines.

* * * * *